Figure 3:
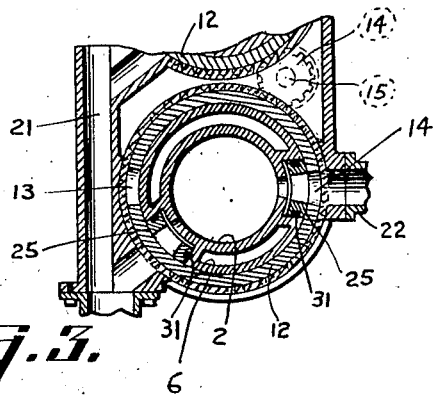

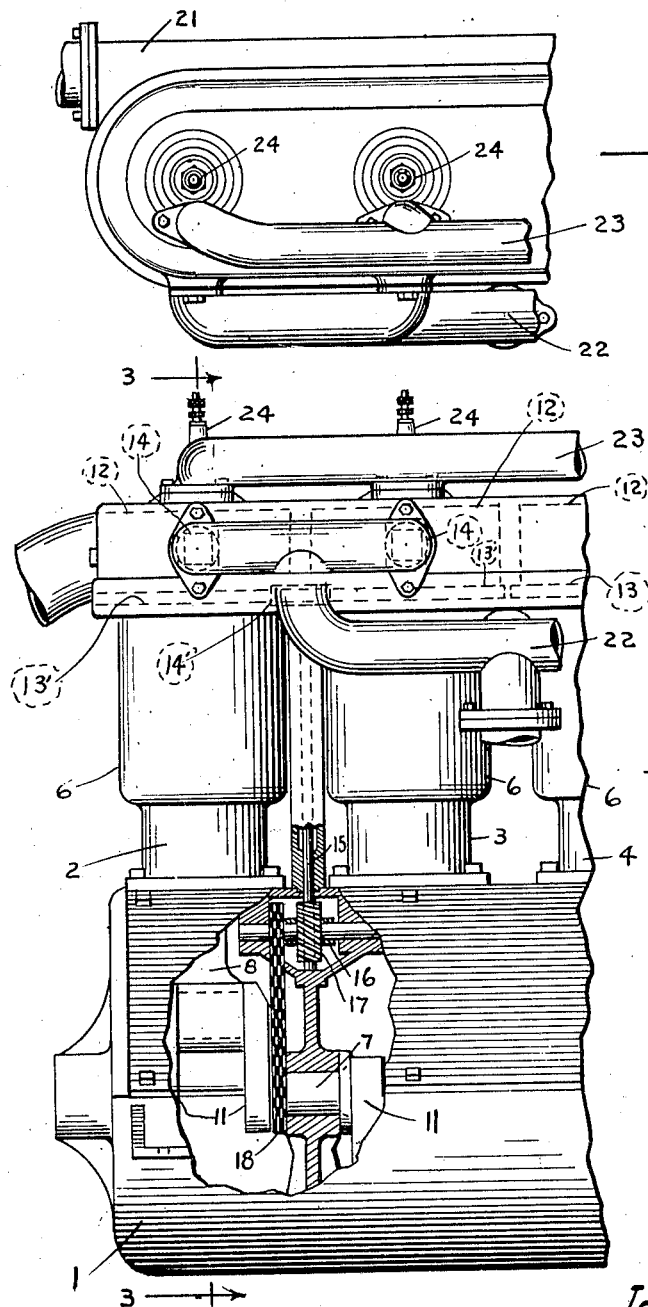

J. F. PAGENDARM.
ROTARY VALVE GAS ENGINE.
APPLICATION FILED APR. 12, 1918.

1,308,722.

Patented July 1, 1919.
2 SHEETS—SHEET 2.

INVENTOR.
JOHN F. PAGENDARM
BY
Carlos P. Griffin
ATTORNEY.

UNITED STATES PATENT OFFICE.

JOHN F. PAGENDARM, OF SAN FRANCISCO, CALIFORNIA, ASSIGNOR OF SEVENTY PER CENT. TO JOHN W. SHANNON, OF SAN RAFAEL, CALIFORNIA, AND TEN PER CENT. TO WILLIAM VON HACHT, TEN PER CENT. TO CHARLES R. TAYLOR, AND TEN PER CENT. TO WILLIAM F. CLEWE, ALL OF SONOMA, CALIFORNIA.

ROTARY-VALVE GAS-ENGINE.

1,308,722.

Specification of Letters Patent.

Patented July 1, 1919.

Application filed April 12, 1918. Serial No. 228,267.

*To all whom it may concern:*

Be it known that I, JOHN F. PAGENDARM, a citizen of the United States, residing at San Francisco, in the county of San Francisco, State of California, have invented a new and useful Rotary-Valve Gas-Engine, of which the following is a specification in such full and clear terms as will enable those skilled in the art to construct and use the same.

This invention relates to a rotary valve gas engine and its object is to produce a rotary valve engine which will have the valve protected from the high heat of explosion of the explosion engine cylinder, while at the same time suitable means are provided for sealing the exhaust and inlet ports so that there will be no leakage of gas during the explosion and compression periods.

Another object of the invention is to provide a valve which may be operated in pairs from a single pinion whereby one operating shaft only is required for each pair of cylinders used.

Other objects of the invention will appear as the description proceeds.

An embodiment of the invention is shown in the drawings in which the same reference numeral is applied to the same portion throughout, but I am aware that there may be modifications thereof.

Figure 4:
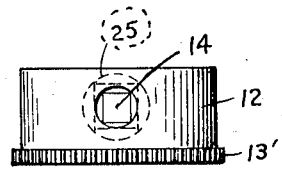
Figure 6:
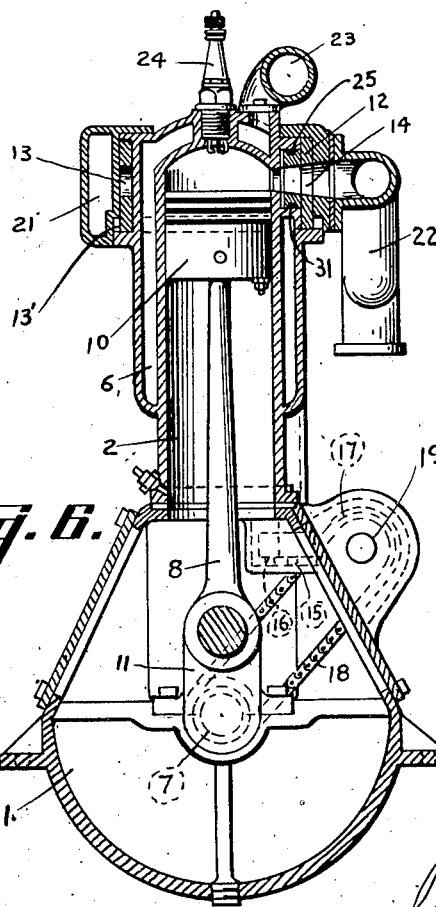
Figure 5:
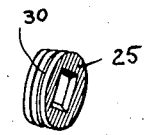
Figure 7:
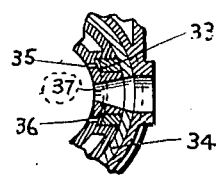
Figure 8:
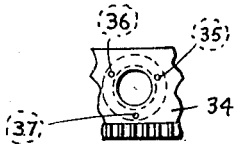

Figure 1 is a plan view of a portion of an an engine having this invention applied thereto, Fig. 2 is a side elevation of the engine with a portion of the crank case broken away and equipped with this valve, Fig. 3 is a sectional plan view of a portion of one of the engine cylinders showing a portion of the valve on an adjoining cylinder, Fig. 4 is a side elevation of one of the rotary valves, Fig. 5 is a perspective view of one of the packing rings used in connection with the valve, Fig. 6 is a vertical sectional view of the engine shown in Fig. 1 showing the valve and inlet ports therein, Fig. 7 is a plan view in section of a slightly modified form of valve packing ring, and Fig. 8 is a side elevation of the valve packing ring shown in Fig. 7.

The numeral 1 indicates the engine base which may be of any suitable form and which supports the cylinders 2, 3, 4, or any other number of said cylinders being bolted to the base in a well known manner, and having walls 6 forming a water jacket about the same. The crank shaft is indicated at 7 and there are links 8 connecting the piston 10 with the cranks 11, all of which is well known in the art.

The rotary valve comprises a thin ring 12 with ports 13 and 14 therein, said ports being set opposite to one another in such a manner as to permit the inlet and escape of the gases used in the engine. At the lower edge of the ring 12 there is a gear 13', which gear is in mesh with a pinion 14' on a vertical shaft 15, said shaft having another gear 16 at its lower end in mesh with the gear 17. The shaft 15 is driven by means of a chain 18 passing around the crank shaft and around the gear 17, the shaft 19 on which the gear 17 is secured rotating at the same speed as the crank shaft, while the gear 14' rotates the valve 12 at one-quarter the crank shaft speed, and since said valve is outside the water jacket there is little danger of it being prevented from turning due to overheating.

The exhaust manifold is shown at 21 while the inlet manifold is shown at 22 and the water cooling manifold is shown at 23. The engine has the usual spark plugs 24 for the operation thereof. In order to prevent the leakage of the gas at the ports, the ports leading into the engine cylinder are provided with movable rings 25 which press upon the ring 12 at the time of explosion and shortly thereafter until the explosion pressure has run down low enough to cease to be effective. As soon as the suction in the cylinder takes place the packing ring 25 is moved away from the ring 12, thereby reducing the friction on said packing ring and restoring thereto a quantity of oil in a thin film which will prevent the ring valve from turning hard.

The packing ring shown at 25 is provided with grooves 30, which grooves act to prevent the escape of gas from the engine when under explosion. The ring 25 may be provided with piston rings 31, if desired, but that does not appear to be absolutely necessary.

In Figs. 7 and 8 there is shown a slightly modified form of packing ring in which the ring is let into a channel like groove of the inner part of the engine cylinder as shown at 33, and in order to hold said ring tightly against the valve 34 three small openings 35, 36 and 37 are provided to allow a certain quantity of gas under pressure to pass into the chamber formed by the ring and cylinder walls, but since the holes 35, 36, 37 are very small substantially, no amount of gas will leak therethrough, although it will hold said rings tightly against the valve 34 during the explosion period, while as soon as the suction stroke comes on, the ring will move back and release itself from the moving valve ring.

It is to be noted that the casing surrounding the valve is in one position for all of the cylinders and that it is placed thereon by moving it vertically, and it is also to be noted that the pressure on the valve ring 12 is almost equalized since the inlet and outlet ports are on opposite sides of the cylinder.

Another feature that will be noted in connection with both forms of packing gland is that the tendency of the gas pressure within the cylinder is to force the packing rings outwardly into contact with the rotary valve during the time of explosion and compression, while during the time of inlet the tendency is to draw these rings away from the rotary valves, thereby relieving the valve of considerable wear and enabling a film of oil to be distributed over that portion of the packing gland that is in contact with the rotary valve.

Having thus described my invention what I claim as new and desire to secure by Letters Patent of the United States is as follows, express reservation being made of permissible modifications:

1. A rotary valve explosion engine comprising an engine cylinder having a suitable water jacket, a rotary sleeve valve surrounding the engine cylinder outside the water jacket and having ports adapted to register with ports in the engine cylinder, packing rings surrounding the inlet and exhaust ports of the engine cylinder and bearing upon the inside of the valve ring, a piston packing ring carried by each of the aforesaid packing rings, and movable at right angles to their lines of movement.

2. A rotary valve gas engine comprising an engine cylinder having inlet and exhaust ports, a rotary sleeve surrounding the engine cylinder, packing rings surrounding the inlet and exhaust ports of the cylinder and bearing upon the rotary sleeve valve, the engine casing having passage ways to permit the gas within the cylinder to force the rings into engagement with the valve on the compression and explosion strokes, and rings embracing the aforesaid packing rings and movable in the plane of said rings.

3. A rotary valve gas engine comprising an explosion engine cylinder, a rotary sleeve valve surrounding the engine cylinder and having ports adapted to register with inlet and outlet ports of the engine cylinder, a ring surrounding the inlet and outlet ports of the engine cylinder and bearing upon the inside of the rotary valve, and piston ring packing carried by the first mentioned ring, and movable in the plane of the first ring, to prevent the escape of gas from the engine cylinder.

In testimony whereof I have hereunto set my hand this 9th day of March A. D. 1918.

JOHN F. PAGENDARM.